United States Patent [19]
Possati

[11] 3,745,968
[45] July 17, 1973

[54] DEVICE FOR CHANGING THE SCALE OF A MEASURING INSTRUMENT

[75] Inventor: Mario Possati, Bologna, Italy

[73] Assignee: Apparecchi Elettronici Marposs, Bologna, Italy

[22] Filed: Oct. 5, 1971

[21] Appl. No.: 186,696

[30] Foreign Application Priority Data
Oct. 16, 1970 Italy.................... 3587 A/70

[52] U.S. Cl. .................. 116/129 R, 324/154 PB
[51] Int. Cl. .................................... G09f 9/00
[58] Field of Search................ 116/124, 133, 124.1, 116/129, 136.5, 129 A, 129 B, DIG. 6; 58/127, 127 B; 324/115, 154 PB; 177/165

[56] References Cited
UNITED STATES PATENTS

| | | | |
|---|---|---|---|
| 698,647 | 4/1902 | Duncan............................ | 324/115 |
| 2,078,031 | 4/1937 | Emde........................... | 116/124.1 R |
| 2,114,540 | 4/1938 | MacNabb..................... | 116/124.1 R |
| 2,467,899 | 4/1949 | Lowkrantz.................. | 116/129 A X |
| 2,720,187 | 10/1955 | Lamb............................ | 116/129 A |
| 2,999,478 | 9/1961 | DuBois ....................... | 116/129 |
| 3,604,390 | 9/1971 | Zuck............................ | 116/129 A |
| 3,633,534 | 1/1972 | Hersey........................ | 116/124 |

Primary Examiner—Louis J. Capozi
Attorney—Richard K. Stevens, Richard C. Harris et al.

[57] ABSTRACT

A scale-changing device wherein a fixed sector bears a first scale and at least one movable second sector bears a second scale, and means are provided to displace said movable sector from a position of rest to an operating position wherein it is superimposed over said fixed sector, so that only one of said scales is selectively visible.

3 Claims, 1 Drawing Figure

PATENTED JUL 17 1973
3,745,968
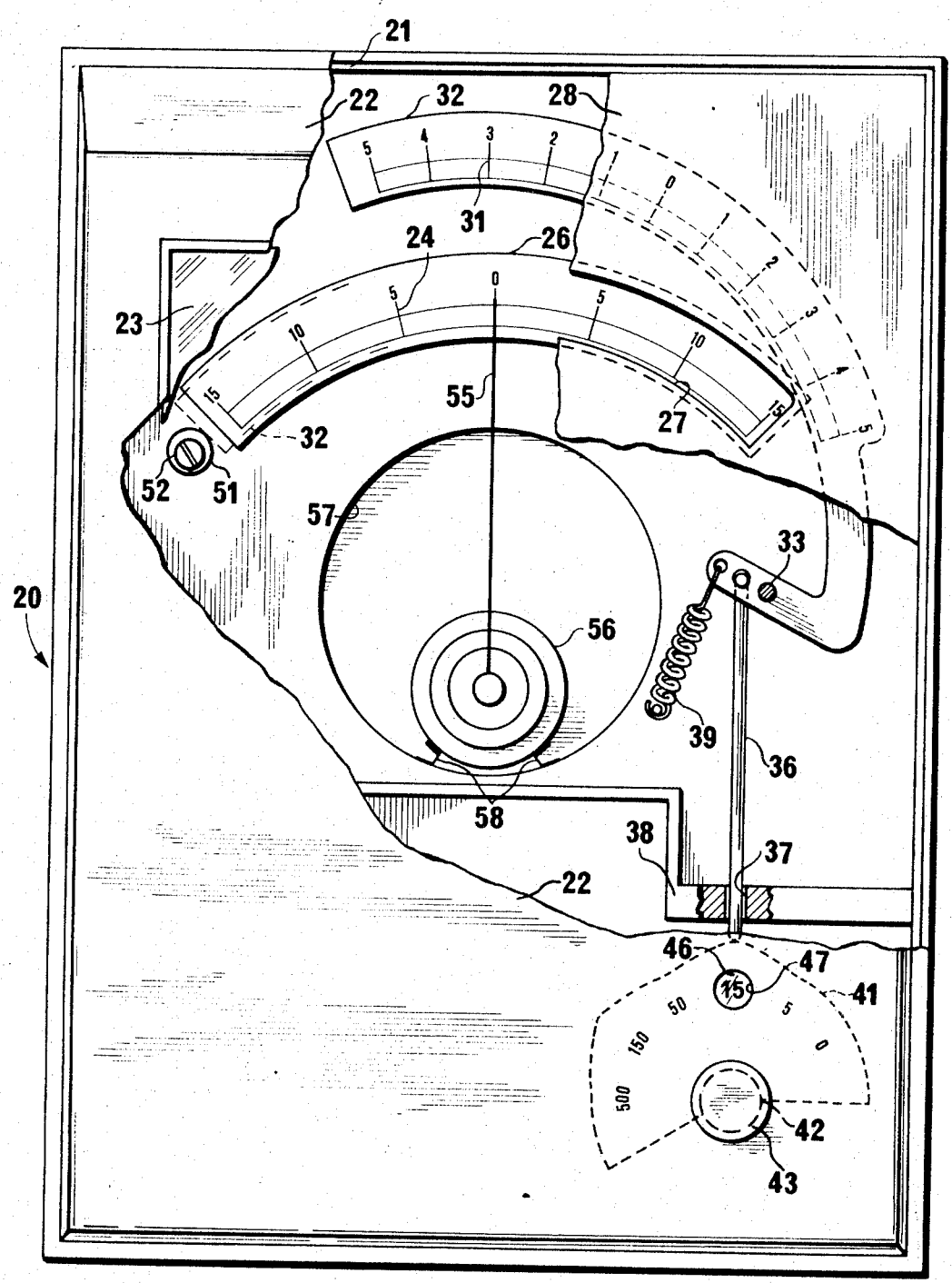
INVENTOR.
MARIO POSSATI
BY
Stevens, Davis, Miller & Mosher
ATTORNEYS

DEVICE FOR CHANGING THE SCALE OF A MEASURING INSTRUMENT

The present invention relates to a device for changing the scale of a measuring instrument in which at least two scales for different sensitivities of measurement are required.

In the instruments known up to the present time, the two scales are provided on a single panel, one parallel to the other, and possibly marked in different colors, the color of the scale to be used being the same as the color visible on the scale sensitivity switch. However, with these arrangements the use of this type of instrument is always very difficult and tiring due to the continuous attention which must be paid at the time of reading the scale. Furthermore, the possibility of errors is very high since it is extremely easy to confuse the two scales.

The technical problem which the present invention is directed at solving is to create a device for changing the scales which is simple and easy to use and makes errors in reading due to confusing the different scales practically impossible.

This problem is solved by the scale-changing device in accordance with the invention which is characterized by a fixed sector which bears a first scale and at least one movable sector which bears a second scale, means being provided to displace said movable sector from a position of rest to an operating position in which it is superimposed over said fixed sector, so that only one of said scales is thus selectively visible.

The following description represents a preferred embodiment of the invention, given by way of illustration and not of limitation, with the aid of the accompanying drawing, in which:

The sole FIGURE shows a front view, partially in section, of the scale-changing device in accordance with the invention.

The measurement instrument is inserted in a housing 20 formed of a lower part 21 and an upper part 22. The upper part 22 is provided with a transparent portion 23 in order to make it possible to view a scale 24 arranged below it. The scale 24 is provided on a sector 26 which is fastened to the lower part 21 of the housing 20 and is visible through an opening 27 provided in a plate 28 fastened to the part 21 of the housing 20.

The instrument is provided with a second scale 31 provided on a sector 32 which is pivoted on a pin 33 fastened to the lower part of the housing 20. The sector 32 cooperates by means of a pin 36 guided in a hole 37 in an inner wall 38, under the action of a spring 39, with a cam 41 fastened on a drive shaft 42 of a multi-position sensitivity switch, which is known per se and not shown in the drawing. The shaft 42 is rotatable on the upper part 22 of the housing 20 and is provided with a handle 43 which facilitates the turning thereof. The switch is a six-position switch, one position differing from the adjacent ones by a rotation of the shafts 42 of 30°. Corresponding to these positions there are arranged the numbers 0, 5, 15, 150 and 500, respectively, which are selectively visible through a suitable magnifying lens 46 fastened in a hole 47 in the upper part 22 of the housing 20. When the cam 42, and thus the switch, is at position 0, the apparatus is disconnected. The other indications represent the value of the bottom of the scale of the measurement with the switch in the different positions.

The cam 42 has substantially two lobes corresponding to the numbers 15 and 150 and three recesses corresponding to the numbers 5, 50 and 500. When the cam has one of its two lobes in correspondence with the pin 36 and therefore with one of the numbers 15 and 150 visible through the opening 47, the sector 32 is held in the position indicated in the figure with the scale 31 hidden by the plate 28 and with the scale 24 visible through the opening 27. In this way, the value read on the scale coincides in the proper unit of magnitude with the actual value of the measurement.

If, however, the cam 42 is moved so that one of the recesses is in position corresponding to the pin 36, the sector 32, under the action of the spring 39, rotates counterclockwise, coming over the sector 26 and therefore concealing the scale 24. The recesses are so dimensioned that the rotation of the sector 32 is stopped by an eccentric disk 51 pivoted by a pin 52 on the lower part 21 of the housing 20. The eccentric disk 51 can be regulated in such a manner that the zero of the scale 31 coincides with that of the scale 24. In this way, only scale 31 is visible and the value read on it coincides in the proper unit of magnitude with the actual value of the measurement.

The measurements are indicated by a needle 55 controlled, in a manner known per se, by a control group 56 inserted in a cavity 57 provided in the lower part 21 of the housing and fastened therein by means of supports 58.

It is obvious that various changes or additions can be made in the device described without going beyond the scope of the invention.

For example, instead of the sector 32 being pivoted, it can be arranged on guides and move parallel to itself with a simple movement of translation. In this way more than one sector can be provided on the same support, for instance, two, namely one above the fixed sector and one below it. By using a three-position cam, the three sectors can be made selectively visible.

What is claimed is:

1. An apparatus for changing the indicating scales of a measuring instrument, comprising:
   a first member mounted on said apparatus and having a first scale provided thereon;
   a second member having a second scale provided thereon and pivotally mounted on said apparatus for movement into and out of an operating position;
   an axially movable pin mounted on said apparatus and coupled to said second member; and
   multi-position switch means having a rotatable cam with at least one lobe and one recess engaging said pin, wherein rotational movement of said cam between positions of engagement of said pin with said lobe and said recess, alternately, produces an axial movement of said pin and a corresponding pivotal movement of said second member into and out of said operating position, respectively.

2. The apparatus according to claim 1, wherein said rotatable cam bears, in correspondence with its lobes and recesses, a series of numbers selectively visible, said numbers representing the full-scale values corresponding to the different positions of said switch means.

3. The apparatus according to claim 1, further comprising rotatable eccentric means cooperating with an end of said movable sector for causing its rotation about said pivoting means, so as to adjust its position with respect to an indicating needle of the instrument.

* * * * *